Feb. 3, 1959 OTT-HEINRICH BLAUM 2,872,002
RAPID BRAKING ARRANGEMENT FOR FORWARD-AND-REVERSE DRIVES
Filed Sept. 6, 1955

INVENTOR
OTT-HEINRICH BLAUM

BY Toulmin & Toulmin
ATTORNEYS

United States Patent Office 2,872,002
Patented Feb. 3, 1959

2,872,002

RAPID BRAKING ARRANGEMENT FOR FORWARD-AND-REVERSE DRIVES

Ott-Heinrich Blaum, Darmstadt, Germany, assignor to Licentia Patent-Verwaltungs-G. m. b. H., Hamburg, Germany Application September 6, 1955, Serial No. 532,397

Claims priority, application Germany September 6, 1954

5 Claims. (Cl. 192—21.5)

This invention relates to an electrical arrangement for rapid braking of forward and reverse drives comprising control clutches, in particular of the type comprising two driven members which are alternately excited with the aid of two windings for the passage of electrical current whereby they are caused to run in opposite directions while being coupled to the driving member.

The invention relates more particularly to such arrangements to be used for regulating and controlling forward and reverse drives employing magnet-powder clutches and eddy-current clutches.

In the forward and reverse drives of this type known in the art, excitation of the clutches used therein is brought about by direct current which is obtained, for instance, from an alternating current main by way of transformers, rectifiers and, in certain cases, intermediary or series resistors. When the control device is to be used, while the coupling is in operation, one of the aforesaid two windings is excited, and the corresponding driven member of the respective clutch is engaged. Thereby, a shiftable element such as a shaft is caused to change its sense of rotation from either forward to reverse direction or vice versa. In order to reverse the operation of the coupling arrangement or drive, it is necessary to interrupt the flow of current through the circuit of the excited winding and to close the circuit containing the other winding whereupon current, flowing through this other winding, causes the aforesaid shiftable member to shift to an inverted position, i. e. the shaft to rotate in an opposite sense.

If this interruption of the current were to take place in the direct current circuit, it would require contact drums or other control means having a relatively large momentum. Furthermore, this would cause a relatively high wear at the contact surfaces. Interruption of the current in the alternating current circuits, is, therefore, generally preferred in the art.

If a coupling of the above described type is to be used as a brake, the response of the control arrangement to the interruption of current for one of the windings has, in all hitherto known apparatus, been too slow.

It is, therefore, an object of this invention to provide an improved rapid braking arrangement for forward and reverse drives employing, in particular, magnet-powder clutches or eddy-current clutches, which is distinguished from the control arrangement known in the art by a particularly rapid braking of the driven member of the drive.

This and other advantages are achieved by the rapid braking arrangement according to my invention wherein the exciter winding of each of the two driven coupling members is provided with a connector means which will automatically switch on one of the two exciter windings after the other exciter winding has been switched off, so that both exciter windings will be excited by the decaying current. It is thereby guaranteed that the decaying current will generate counteracting torques in both coupling members, adapted for being driven, thereby rapidly braking the driven member.

The nature of my invention will be more clearly understood from the description of the same given hereinafter in connection with the accompanying drawing wherein.

Figure 1:
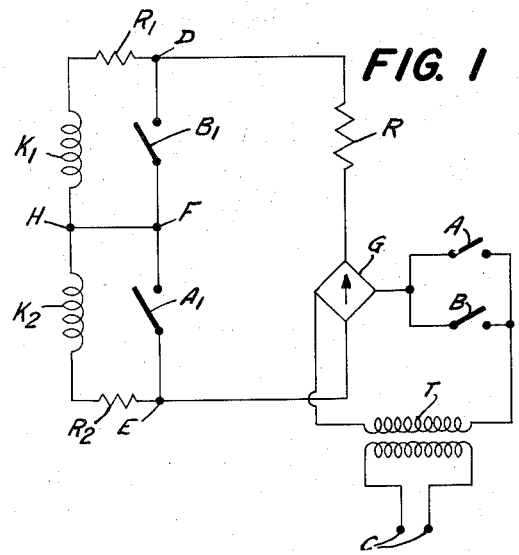
Figure 1 illustrates schematically a wiring diagram according to the invention, adapted to be used as a rapid braking arrangement with a forward and reverse drive.

Referring now to Figure 1 more in detail, reference characters $K_1$ and $K_2$ designate the exciter winding means or coils which are mounted on two driven members (for instance magnetic powder clutches $N_1$ and $N_2$ in Figure 2) of the coupling, which members are adapted to bring about a reversal of the operation of the drive.

Figure 2:
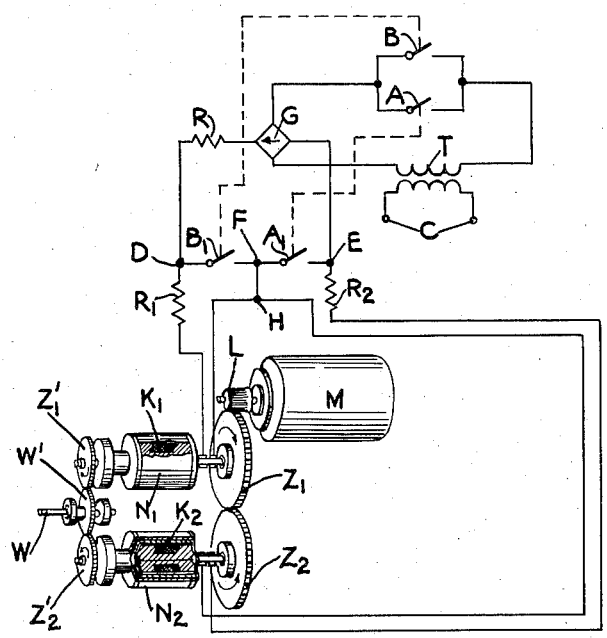
Figure 2 illustrates the same arrangement as in Figure 1 installed in a conventional forward and reverse drive comprising two magnet powder clutches as driven coupling members.

Fig. 2 shows the motor M and the conventional driving means comprising a pinion L, an output shaft W, and gears $W'$, $Z_1$, $Z_2$, $Z_1'$ and $Z_2'$. It will readily be seen from Fig. 2 that when the winding $K_1$ of clutch $N_2$ is energized, the motor M will rotate the output shaft W in one direction through the intermediary of pinion L and gears $Z_1$, $Z_1'$ and $W'$, whereas when the winding $K_2$ of clutch $N_2$ is energized, the output shaft W is rotated in the opposite direction through the intermediary of pinion L and gears $Z_1$, $Z_2$, $Z_2'$ and $W'$. These driving means form no part of my invention.

The windings $K_1$ and $K_2$ together with the respective clutches $N_1$ and $N_2$ of the drive are actuated alternatingly, either by hand or automatically, thus effecting the reversal of the sense of rotation of a reversible member (for instance, shaft W) in the desired sense.

The exciter windings $K_1$ and $K_2$ are connected in series and are fed with current from a source of alternating current C by way of a transformer T, the secondary current of which transformer is fed through a rectifier G and an intermediary resistance R to the exciting circuits for the windings $K_1$ and $K_2$ at points D and E. The rectifier G consists preferably of four stacks of elements connected as a bridge rectifier, or of a similar device acting as a full-wave rectifier.

Current is supplied to the windings by switching on the contactor means A or B in the alternating current circuit. The contactor A is adapted to actuate the bridge connector $A_1$ in the circuit of the exciter winding $K_2$ while the contactor B actuates upon the bridge connector $B_1$ in the circuit of exciter winding $K_1$.

When the contactor A is actuated to close the alternating current circuit, it also closes the bridge contactor $A_1$ and short-circuits the winding $K_2$ which thereby becomes dead. Consequently, only the winding $K_1$ is excited and acts upon the reversible member (shaft W) causing the latter to reverse its sense of rotation. If, after the reversible member has assumed the desired sense of rotation, the reversing operation is to be interrupted, by opening the contactor A. Thereby, the bridge connector $A_1$ is also opened and the winding $K_2$ is again connected in series with the winding K. Thereby, the decaying current generates torques in opposite direction in the clutches $N_1$ and $N_2$ connected to the windings $K_1$ and $K_2$, respectively, and a rapid braking of the driven side of the drive is achieved.

If the contactor B is closed instead of the contactor A, the contactor $B_1$ is closed, shunting off the winding $K_1$. The sense of rotation of the driven side of the drive is then reversed, as compared with the sense of operation when winding $K_2$ is shunted off. When interrupting the contactor B, the same braking effect is achieved as described hereinbefore.

It will be understood that this invention is susceptible to further modification and, accordingly, it is desired to comprehend such modifications within this invention as may fall within the scope of the appended claims.

I claim:

1. A rapid braking arrangement for use with a forward and reverse drive comprising a driving member, two driven members and a reversible member, which arrangement comprises electric exciter winding means, disposed within each of said driven members, said winding means being connected in series and adapted to be excited by the flow of electric current therethrough, a device comprising connector means provided for each of said winding means in each of said driven members, said connector means establishing current flow through one of said winding means while shunting off the other of said winding means, and rectifier means provided for alternately supplying current to one or the other of said winding means, said rectifying means comprising multiple stacks of rectifying elements connected in a bridge rectifier and contactor means in the supply current to said rectifier means, each of said contactor means actuating one of said connector means, one of the connector means being actuated serving to shunt when in association with said rectifier, so that the winding means pertaining to the actuated connector means is not excited, said non-excited winding means being connected in series with the excited winding means and excited by the decaying current therefrom when the contactor and the connector means corresponding to the excited winding are interrupted, simultaneous excitation of both winding means during the decay of the current effecting rapid braking of the drive.

2. A reversible drive incorporating a rapid braking arrangement, comprising, in combination, a driven means; two driving means for driving said driven means in opposite directions, respectively, each of said driving means having electric winding means for activating the respective driving means when an electric current flows through the winding means; a source of direct current; and circuit control means interconnecting said winding means and said source and being capable of assuming three positions, in the first of which positions said source is in series-circuit with one of said winding means, in the second of which positions said source is in series-circuit with the other of said winding means, and in the third of which positions said two winding means are in series-circuit with each other, whereby when said control means is in its first position said driven means is driven in one direction and when said control means is in its second position said driven means is driven in the opposite direction, and whereby upon movement of said control means to its third position from either its first or second position, the decaying current flowing in the winding means the excitation of which was discontinued upon such movement of said control means, will flow through the other winding means as well, so that during the lifetime of the decaying current the driving means of which said other winding means is a part will act upon said driven means and tend to reverse the movement thereof, thus producing rapid braking.

3. A reversible drive incorporating a rapid braking arrangement, comprising, in combination, a driven means; two driving means for driving said driven means in opposite directions, respectively, each of said driving means having electric winding means for activating the respective driving means when an electric current flows through the corresponding winding means, said winding means being connected in circuit with each other; two shunting means connected across said winding means, respectively; a source of direct current connected across the circuit constituted by said two winding means; and switching means for simultaneously activating said source and operating either one of said two shunting means, whereby upon actuation of said switching means said driven means may be moved in either direction, whereas upon deactuation of said switching means said winding means will be in series circuit with each other so that a decaying current flowing in the winding means the excitation of which was discontinued upon deactuation of said switching means, will flow through the other winding means as well, in consequence of which the driving means of which said other winding means is a part will, during the lifetime of the decaying current, act upon said driven means and tend to reverse the movement thereof, thus producing rapid braking.

4. The combination defined in claim 3 wherein said source of direct current includes a source of alternating current and rectifier means for rectifying the alternating current.

5. The combination defined in claim 4 wherein said switching means include switch means in circuit with said source of alternating current.

References Cited in the file of this patent

UNITED STATES PATENTS

| | | |
|---|---|---|
| 2,523,918 | Petschauer | Sept. 26, 1950 |
| 2,573,152 | Leifer | Oct. 30, 1951 |
| 2,636,138 | Few | Apr. 21, 1953 |
| 2,687,197 | Leifer | Aug. 24, 1954 |
| 2,760,739 | Reichert | Aug. 28, 1956 |

FOREIGN PATENTS

| | | |
|---|---|---|
| 187,399 | Germany | June 10, 1907 |